United States Patent [19]
Cecchini

[11] Patent Number: 5,390,038
[45] Date of Patent: * Feb. 14, 1995

[54] HALF-DUPLEX COMMUNICATIONS INTERFACE

[76] Inventor: Warren P. Cecchini, 1058 Jefferson Rd., Penn Hills, Pa. 15235

[*] Notice: The portion of the term of this patent subsequent to Sep. 22, 2009 has been disclaimed.

[21] Appl. No.: 897,095

[22] Filed: Jun. 11, 1992

Related U.S. Application Data

[63] Continuation-in-part of Ser. No. 535,389, Jun. 8, 1990, Pat. No. 5,150,244.

[51] Int. Cl.⁶ ............................................. H04B 10/24
[52] U.S. Cl. .................................. 359/113; 359/118; 359/164; 359/179; 370/24
[58] Field of Search ............... 359/113, 118, 127, 125, 359/164, 173, 179; 370/24, 85.9; 340/825, 825.05, 825.5; 375/7, 8; 178/70

[56] References Cited

U.S. PATENT DOCUMENTS

| | | | |
|---|---|---|---|
| 4,399,563 | 8/1983 | Greenberg | 455/607 |
| 4,573,215 | 2/1986 | Oates et al. | 455/607 |
| 4,580,276 | 4/1986 | Andruzzi, Jr. et al. | 375/42 |
| 4,606,023 | 8/1986 | Dragoo | 370/94 |
| 4,630,256 | 12/1986 | Albanese | 370/3 |
| 4,641,373 | 2/1987 | Shutterly | 455/601 |
| 4,641,378 | 2/1987 | McConnell et al. | 455/619 |
| 4,654,844 | 3/1987 | Mandello | 359/113 |
| 4,697,046 | 9/1987 | Geerings et al. | 178/1 |
| 4,809,361 | 2/1989 | Okada et al. | 455/606 |
| 4,815,070 | 3/1989 | Hoshi | 370/60 |
| 4,839,887 | 6/1989 | Yano | 370/60 |
| 4,843,605 | 6/1989 | Hoshi | 370/60 |
| 4,850,042 | 7/1989 | Petronio et al. | 455/606 |
| 4,858,228 | 8/1989 | Hoshi | 370/60 |
| 4,885,742 | 12/1989 | Yano | 370/85.2 |
| 4,887,259 | 12/1989 | Morita | 370/60 |
| 5,060,224 | 10/1991 | Konishi | 359/113 |
| 5,099,346 | 3/1992 | Lee et al. | 359/118 |
| 5,150,244 | 9/1992 | Cecchini | 359/113 |

Primary Examiner—Richard E. Chilcot, Jr.
Assistant Examiner—K. Negash
Attorney, Agent, or Firm—Douglas G. Glantz

[57] ABSTRACT

A data link interface and method are disclosed for controlling signal communications including providing an interface for converting or extending signal communications media in a half-duplex data link between at least two devices or networks and arbitrating the direction of data flow without regard to number of start bits, data bits, or stop bits; without regard to baud rates lower than selected baud rate; or without regard to protocol of the devices on the network.

18 Claims, 5 Drawing Sheets

HALF-DUPLEX COMMUNICATIONS INTERFACE

This application is a continuation-in-part application of co-pending patent application U.S. Ser. No. 07/535389, filed Jun. 8, 1990 now U.S. Pat. No. 5,150,244, issued Sep. 22, 1992.

FIELD OF THE INVENTION

The present invention relates to half-duplex communications. In one aspect, the present invention relates to apparatus and method for facilitating electrical impulse communication between or among independent half-duplex networks or portions of those networks. In one aspect, the present invention relates to apparatus and method for facilitating communication between or among independent half-duplex networks or portions of those networks via connection by optical fiber.

BACKGROUND OF THE INVENTION

As computers have become more sophisticated, networks have developed to allow individual computers to communicate with each other. Protocols are used in an attempt to guarantee accuracy in the information passing through the networks to and from the computers. These protocols may vary from product to product.

INTRODUCTION TO THE INVENTION

In data processing systems today, there are two basic means of communicating between components. One method is single-ended, which uses only one signal line for data transmission, and the other is differential, which uses two signal lines.

The Electronics Industry Association (EIA) has developed several standards to simplify the interface in data communications systems.

When transmitting over long distances and through noisy environments, single-ended transmission is often inadequate. In these applications, differential data transmission offers superior performance. Differential transmission nullifies the effects of ground shifts and noise signals which appear as common mode voltages on the transmission line.

RS-422 was defined by the EIA for this purpose and allows data rates up to 10 MBaud (up to 40 ft.) and line lengths up to 4000 feet (up to 100 kBaud).

Drivers designed to meet this standard are well suited for party-line type applications where only one driver is connected to, and transmits on, a bus or network, and up to 10 receivers can receive the data. While a party-line type of application has many uses, RS-422 devices cannot be used to construct a truly multipoint bus or network. A multipoint bus or network includes multiple drivers and receivers connected to a single bus, and any one of which can transmit or receive data.

To meet the need for truly multipoint communications, the EIA established RS-485 in 1983. RS-485 meets all the requirements of RS-422, but in addition, this new standard allows up to 32 drivers and 32 receivers to be connected to a single bus, thus allowing a truly multipoint bus or network to be constructed.

The proliferation of half-duplex networks such as 2 wire RS-485 and RS-422 networks presents a growing need for networks to be able to communicate with each other effectively. Effective signal communication also is a concern with protocols when networks communicate with one another as when computers on a given network communicate with one another. Two or more networks connected together essentially become one larger network with each computer having a need to communicate effectively with the other computer(s).

When computers or networks are distances apart, such as a computer or network in a first location and a computer or network located at a distance, by way of example, miles away in a second location, optical fiber can provide advantages, including resistance to electromagnetic or radio frequency interference over large distances. U.S. Pat. No. 4,850,042 to Petronio et al is one example of an apparatus that converts electrical signals to optical signals and vice versa to connect a specific type of two or more computers or networks.

In one aspect, the present invention is another example of such an apparatus, but which requires no external control of the apparatus.

In another aspect, the present invention allows connection of computers or networks without regard to number of start bits, data bits, or stop bits, or to the type of protocol the computer or network is using.

SUMMARY OF THE INVENTION

The present invention provides a data link interface and method for controlling signal communications including providing an interface for converting or extending signal communications media in a half-duplex data link between at least two devices or networks and arbitrating the direction of data flow without regard to number of start bits, data bits, or stop bits; without regard to baud rates lower than selected baud rate; or without regard to protocol of the devices on the network.

The present invention provides apparatus and method for connecting at least two independent half-duplex networks, including means and method for receiving signals from a first device network, for converting the signals to optical signals, and for transmitting the optical signals along optical fiber to another device or network. The present invention converts optical signals it receives to electrical signals and transmits the signals to a second device or network. The present invention controls the flow of signals to and from the devices, networks, and optical fibers without any external control signals.

The present invention further provides means and method for connecting two networks together with wire by replacing the optical interfaces with a second RS-485 interface to provide a RS-485 repeater.

In one aspect, the present invention provides apparatus and method including a first optical receiver for receiving optical digital signals from a first optical fiber. The connections include a second optical receiver for receiving an optical digital signal from a second optical fiber. An interface connects with the first and second optical receivers and a half-duplex line for either receiving electrical digital signals from the half-duplex line and sending them to a first and second optical transmitter or sending electrical digital signals to the half-duplex line corresponding to optical digital signals received from either the first or second optical receivers. Additionally, the invention includes a first optical transmitter and a second optical transmitter for providing optical digital signals to a third optical fiber and a fourth optical fiber, respectively, corresponding to digital signals received from the first or second optical receivers or the electrical interface. A first trigger circuit connects between the electrical interface and the first and second optical transmitters for passing signals from the interface to the transmitters when the first trigger circuit is in a first state. A receiver data merger connects to the first and second optical receivers for merging the signals therefrom and producing a corresponding signal. Furthermore, a second trigger circuit connects between the receiver data merger and the electrical interface, and the first and second optical transmitters, for passing signals from the receiver data merger to the interface, and to the first and second optical transmitters, when the second trigger circuit is in a first state. The invention provides means and method for controlling when the first and second trigger circuits are in the first state. The controlling means prevents the first and second trigger circuits from both being in the first state at the same time and prevents the other trigger circuit from being in the first state for a predetermined time period after the other trigger circuit is in a second state.

Depending on which input (the optical receivers or electrical interface) receives a signal first, it causes the trigger circuit to which it is connected to continue to receive that signal, and lock out any signals received by the apparatus through any other inputs. The interface which first receives a low signal is allowed to continue receiving, and the signal is transmitted to the other interface (either the electrical interface or the optical transmitters). When the signal received reaches a high state, either interface is then allowed to receive signals after a predetermined time period greater than zero, but less than one data bit.

BRIEF DESCRIPTION OF THE DRAWINGS

In the accompanying drawings, the preferred embodiments of the invention and preferred methods of practicing the invention are illustrated in which:

FIG. 4 further is a representation of a control signal (lock/unlock).

DETAILED DESCRIPTION

Figure 1:
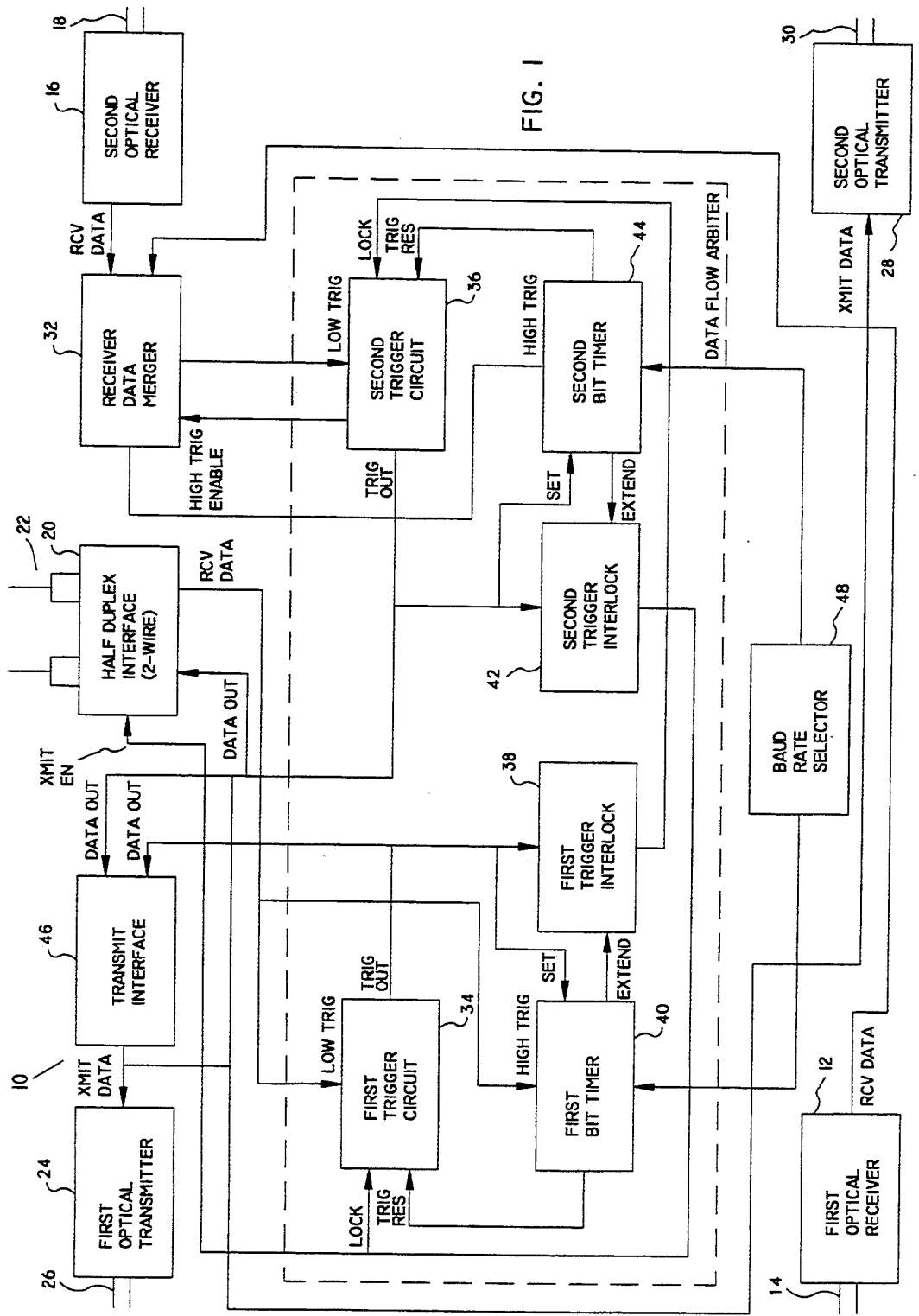
FIG. 1 is a block diagram of the present invention including an interface for converting optical signals.

The present application is a continuation-in-part application of co-pending patent application U.S. Ser. No. 07/535389, filed Jun. 8, 1990 now U.S. Pat. No. 5,150,244 issued Sep. 22, 1992, which is hereby incorporated by reference and included herein as if set forth in detail verbatim. Referring to the drawings, like reference numerals refer to similar or identical parts throughout the several views.

Referring now to FIG. 1, there is shown a block diagram of the present invention. In one aspect, communications network interface 10 includes first optical receiver 12 for receiving optical digital signals from a first optical fiber 14. Second optical receiver 16 provides means for receiving optical digital signals from a second optical fiber 18. In the first optical receiver 12 and the second optical receiver 16, incoming optical signals on the respective optical fibers are converted to a corresponding electrical signal.

Communications network interface 10 further includes an interface 20 which connects to half-duplex line 22 for sending electrical digital signals to half-duplex line 22, corresponding to optical digital signals received from either the first or second optical receivers 12 or 16, respectively. Additionally, interface 20 receives electrical digital signals from the half-duplex line 22. Interface 20 is connected to half-duplex line 22 which preferably is an RS-485 network.

Communications network interface 10 further includes first optical transmitter means 24 for providing optical digital signals to a third optical fiber 26 corresponding to signals received from the first or second optical receivers 12 or 16, respectively, or signals received from interface 20. Additionally, second optical transmitter means 28 provides optical digital signals to a fourth optical fiber 30 corresponding to signals received from first or second optical receivers 12 or 16, respectively, or from interface 20. In the first and second optical transmitter means, 24 and 28, respectively, outgoing electrical signals are converted to optical signals.

Receiver data merger 32 connects to first and second optical receivers 12 and 16, respectively, for merging the signals from first receiver 12 and second receiver 16 and for producing a corresponding signal.

Communications network interface 10 of the present invention further includes first trigger circuit 34 connected to interface 20 and first and second optical transmitters, 24 and 28, respectively, for passing signals from interface 20 to first and second optical transmitters, 24 and 28, respectively, when the first trigger circuit 34 is in a first state. Second trigger circuit 36 connects to receiver data merger 32, interface 20, and the first and second optical transmitters, 24 and 28, respectively, for passing signals from receiver data merger 32 to interface 20 and first and second optical transmitters 24 and 28, respectively, when the second trigger circuit 36 is in a first state.

Means for controlling are provided to activate when the first and second trigger circuits 34 and 36, respectively, are in the first state. The controlling means prevents the first and second trigger circuits 34, 36 from both being in the first state at the same time, and prevents one of the trigger circuits from being in the first state for the predetermined time period after the other trigger circuit is in the second state. Preferably, the controlling means includes a first trigger interlock 38 connected to the first and second trigger circuits 34, 36 for locking out the second trigger circuit 36 while the first trigger circuit 34 is in the first state, and for the predetermined time period after the first trigger circuit 34 is in a second state. The controlling means preferably includes a first bit timer 40 connected to the first trigger interlock 38 for providing a signal to the first trigger interlock 38 causing the first trigger interlock 38 to unlock the second trigger circuit 36 when the predetermined time period has passed after the first trigger circuit is in a second state. Preferably, the predetermined time period corresponds to a time period greater than zero but less than the time period for one data bit for a given baud rate.

The present invention preferably includes in the controlling means a second trigger interlock 42 connected to the first and second trigger circuits 34, 36 for locking out the first trigger circuit 34 from the first state, while the second trigger circuit 36 is in the first state, and for the predetermined time period after the second trigger circuit is in the second state. A second bit timer 44 connects to the second trigger interlock 42 for providing a signal to the second trigger interlock 42, thereby causing the second trigger interlock 42 to unlock the first trigger circuit 34 when the predetermined time period has passed after the second trigger circuit is in the second state.

In the operation of the communications network interface 10, an electrical signal travels along the half-duplex RS-485 network 22 and is received by the interface 20. The electrical signal then is passed to first trigger circuit 34 and bit timer 40. A low signal received by first trigger circuit 34 causes the first trigger circuit to pass a signal to first trigger interlock 38 and to transmit interface 46. When first trigger interlock 38 receives a signal from a first trigger circuit, the first bit timer 40 is set to receive a high trigger signal, and consequently a signal is produced when a high signal is received by it, as is further discussed hereinbelow.

First trigger interlock 38 also sends a signal to second trigger circuit 36 causing second trigger circuit 36 to be locked out of a first state, and thus not able to receive any signals from the receiver data merger 32 and transmit them. As long as low signals are received continually by the first trigger circuit from interface 20, such low signals will be transmitted continually to the transmit interface 46 and to the optical transmitters 24 and 28 without interruption by other signals coming in from any other inputs to the communications network interface.

A limit to the length of time the transmitters can be on is approximately one second as discussed hereinbelow.

Transmit interface 46 provides the signals to first optical transmitter 24 which produces optical signals corresponding to the electrical signals received by the interface 20 or receiver data merger 32 onto the first optical fiber 26. Signals from the transmit interface also are provided to second optical transmitter 28 where they are transmitted as optical signals to the fourth optical fiber 30. Additionally, signals from the transmit interface 46 also are provided to interface 20 where they are transmitted to interface 20, reaching the RS-485 half-duplex network 22 only when the signal has originated at either optical receiver 12 or 16.

When a high signal is then received from the RS-485 network 22 by the interface 20, the first bit timer 40 is caused to produce an extend signal to the first trigger interlock, which causes the first trigger interlock to maintain the second trigger circuit locked out of the first state for a predetermined time period corresponding to a length of time greater than zero but less than time essentially equivalent to one data bit. If a low signal is received subsequently by the first trigger circuit 34 while the second trigger circuit 36 is locked out of the first state for the predetermined time period, then the first trigger circuit 34 continues to receive signals from the interface 20 and transmit them from the communications network interface 10 to its outputs as described hereinabove. If a low signal is not received by the first trigger circuit 34 from the interface 20 after the predetermined time period, then the communications network interface 10 is free to receive signals from any of its inputs.

If, for example, another low signal is received first from interface 20 and provided to first trigger circuit 34, then, as described hereinabove, signals from first and second optical receivers 12 and 16, respectively are prevented from being transmitted by the communications network interface 10.

In the further operation of the communications network interface 10, an optical signal travels along optical fiber 14, or 18, is converted to an electrical signal by an optical receiver 12 or 16, and is received by the receiver data merger 32. The electrical signal then is passed to the second trigger circuit 36 and the bit timer 44. A low signal received by the second trigger circuit 36 causes the second trigger circuit to pass a signal to second trigger interlock 42 and to transmit interface 46. When the second trigger interlock 42 receives a signal from the second trigger circuit, it sets the second bit timer 44 to receive a high trigger signal and consequently produce a signal when a high signal is received by it, as is further discussed hereinbelow.

The second trigger interlock 42 also sends a signal to first trigger circuit 34 causing first trigger circuit 34 to be locked out of a first state, and thus not able to receive any signals from the interface 20 and transmit them. As long as low signals are received continually by the second trigger circuit from the receiver data merger 32, they will be transmitted continually to the transmit interface 46 without being interrupted by any other signals coming in from the interface 20 to the apparatus 10.

When a high signal then is received from receiver data merger 32, the second bit timer 44 produces an extend signal to the second trigger interlock which causes the second trigger interlock to maintain the first trigger circuit locked out of the first state for a predetermined time period corresponding to a time greater than zero and less than essentially the length of time of one data bit. If a low signal is received subsequently after the first trigger circuit 34 is locked out of the first state for the predetermined time period, then the second trigger circuit 36 continues to receive signals from the receiver data merger 32 and transmit them from the communications network interface 10 to its outputs as described hereinabove. If a low signal is not received by the second trigger circuit 36 from the receiver data merger 32 after the predetermined time period corresponding to greater than zero but less than one bit, then the communications network interface 10 is free to receive signals from any of its inputs.

If, for example, another low signal is received first by receiver data merger 32 from the first or second optical receivers, 12 or 16, respectively, and provided to second trigger circuit 36, then as described hereinabove, signals from the interface 20 are prevented from being transmitted by the communications network interface 10.

Figure 2:
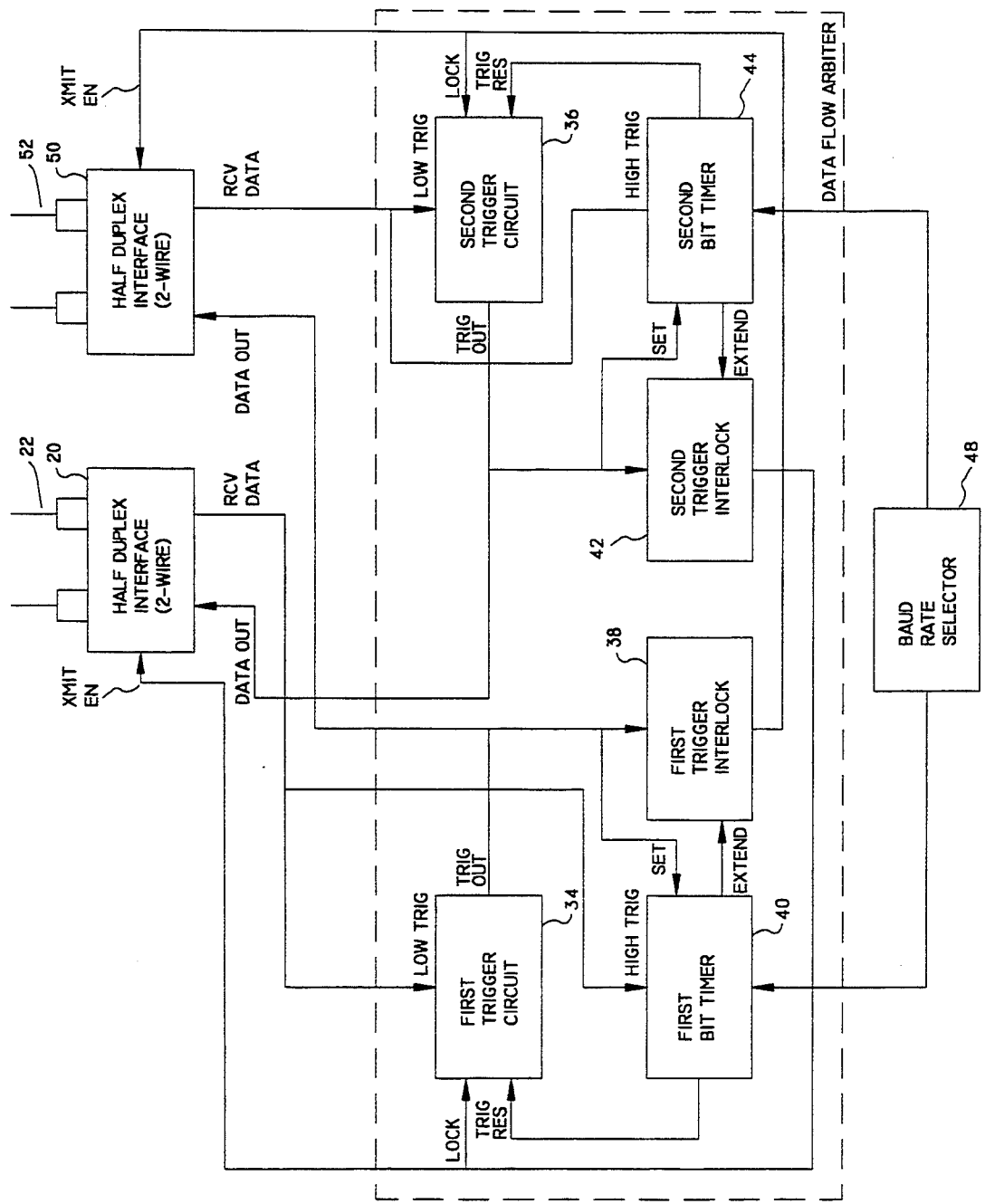
FIG. 2 is a block diagram of the present invention showing a repeater for extending RS-485 networks.

Referring now to FIG. 2, there is shown a block diagram of the present invention in a configuration as an RS-485 repeater. In one aspect, communications network interface 10 includes first receiver (not shown) included in a first interface 20 for receiving signals from a first half-duplex line 22. Line 22 may be either a true tri-state or a non tri-state type. Tri-state means having the output circuits of a device disabled allowing the outputs of that device to remain in a high impedance state. A second receiver (not shown) included in a second interface 50 provides means for receiving signals from a second half-duplex line 52. Line 52 may be either a true tri-state or a non tri-state type. In the first and second receivers, incoming differential signals on the half-duplex interfaces are converted to corresponding transistor transistor logic (TTL) level signal.

Communications network interface 10 further includes two interfaces 20 and 50 which connect to their respective half-duplex line 22, 52 for sending electrical digital signals to half-duplex line 22, 52 corresponding to signals received from the opposite receiver. Additionally, interfaces 20 and 50 receive electrical signals from their respective half-duplex lines 22, 52. Interfaces 20 and 50 are connected each to a half-duplex line 22 and 52 which preferably is an RS-485 network.

Communications network interface 10 of the present invention further includes first trigger circuit 34 connected to interface 20 and second interface 50 for passing signals from interface 20 to the second interface 50 when the first trigger circuit 34 is in a first output state. Second trigger circuit 36 connects to the second interface 50 and interface 20, for passing signals from the second interface 50 to interface 20 when the second trigger circuit 36 is in a first output state.

Means for controlling are provided to activate when the first and second trigger circuits 34 and 36, respectively, are in the first output state. The controlling means prevents the first and second trigger circuits 34, 36 from both being in the first output state at the same time, and prevents one of the trigger circuits from being in the first output state for the predetermined time period after the other trigger circuit is in the second state. Preferably, the controlling means includes a first trigger interlock 38 connected to the first and second trigger circuits 34, 36 for locking out the second trigger circuit 36 while the first trigger circuit 34 is in the first output state, and for the predetermined time period after the first trigger circuit 34 is in a second output state. The controlling means preferably includes a first bit timer 40 connected to the first trigger interlock 38 for providing a signal to the first trigger interlock 38 causing the first trigger interlock 38 to unlock the second trigger circuit 36 when the predetermined time period has passed after the first trigger circuit is in a second output state. Preferably, the predetermined time period corresponds to the time period greater than zero but less than the time period for one data bit for a given baud rate.

The present invention preferably includes in the controlling means a second trigger interlock 42 connected to the first and second trigger circuits 34, 36 for locking out the first trigger circuit 34 from the first output state, while the second trigger circuit 36 is in the first output state, and for the predetermined time period after the second trigger circuit is in the second output state. A second bit timer 44 connects to the second trigger interlock 42 for providing a signal to the second trigger interlock 42, thereby causing the second trigger interlock 42 to unlock the first trigger circuit 34 when the predetermined time period has passed after the second trigger circuit is in the second output state.

In the operation of the communications network interface 10, an electrical signal travels along the half-duplex RS-485 network 22 and is received by the interface 20. The electrical signal then is passed to first trigger circuit 34 and bit timer 40. A low signal received by first trigger circuit 34 causes the first trigger circuit to pass a signal to first trigger interlock 38 and to the second interface 50. When first trigger interlock 38 receives a signal from a first trigger circuit, the first bit timer 40 is set to receive a high trigger signal, and consequently a signal is produced when a high signal is received by it, as is further discussed hereinbelow.

First trigger interlock 38 also sends a signal to second trigger circuit 36 causing second trigger circuit 36 to be locked out of a first output state, and thus not able to receive any signals from the second interface 50 and transmit them out interface 20. As long as low signals are received continually by the first trigger circuit from interface 20, such low signals will be transmitted continually to the second interface 50 without interruption. A limit to the length of time the transmitters can be on is approximately one second as discussed hereinbelow.

When a high signal then is received from the RS-485 network 22 by the interface 20, the first bit timer 40 is caused to produce an extend signal to the first trigger interlock, which causes the first trigger interlock to maintain the second trigger circuit locked out of the first output state for a predetermined time period corresponding a time greater than zero but less than the length of time essentially equivalent to one data bit. If a low signal is received subsequently by the first trigger circuit 34 while the second trigger circuit 36 is locked out of the first state for the predetermined time period, then the first trigger circuit 34 continues to receive signals from the interface 20 and transmit them from the communications network interface 10 to its outputs as described hereinabove. If a low signal is not received by the first trigger circuit 34 from the interface 20 after the predetermined time period of the present invention, then the communications network interface 10 is free to receive signals from any of its inputs. If, for example, another low signal is received first from interface 20 and provided to first trigger circuit 34, then, as described hereinabove, signals from the second interface 50 are prevented from being transmitted by the communications network interface 10.

In the further operation of the communications network interface 10, an electrical signal travels along half-duplex RS-485 network 52 and is received by the interface 50. The electrical signal then is passed to the second trigger circuit 36 and the bit timer 44. A low signal received by the second trigger circuit 36 causes the second trigger circuit to pass a signal to second trigger interlock 42 and to interface 20. When the second trigger interlock 42 receives a signal from the second trigger circuit, it sets the second bit timer 44 to receive a high trigger signal and consequently produce a signal when a high signal is received by it, as is further discussed hereinbelow.

The second trigger interlock 42 also sends a signal to first trigger circuit 34 causing first trigger circuit 34 to be locked out of a first output state, and thus not able to receive any signals from the interface 20 and transmit them. As long as low signals are received continually by the second trigger circuit from interface 50, they will be transmitted continually to the interface 20 without being interrupted.

When a high signal then is received from interface 50, the second bit timer 44 produces an extend signal to the second trigger interlock which causes the second trigger interlock to maintain the first trigger circuit locked out of the first output state for a time period corresponding to greater than zero but less than the length of time of one data bit. If a low signal is received subsequently after the first trigger circuit 34 is locked out of the first output state for the predetermined time period, then the second trigger circuit 36 continues to receive signals from the interface 50 and transmit them from the communications network interface 10 to interface 20 as described hereinabove. If a low signal is not received by the second trigger circuit 36 from interface 50 after the predetermined time period, then the communications network interface 10 is free to receive signals from any of its inputs.

If, for example, another low signal is received first by interface 50 and provided to second trigger circuit 36, then as described hereinabove, signals from the interface 20 are prevented from being transmitted by the communications network interface 10.

The repeater of the present invention provides means and method for monitoring data level as opposed to line condition. Data level here refers to the logic level of the data received (low or high). Line condition refers to whether or not the line is not in a tri-state condition (versus driven to any logic level). Accordingly, by monitoring data logic level, the present invention will operate successfully on either tri-state or non-tri-state conditions.

Figure 3:
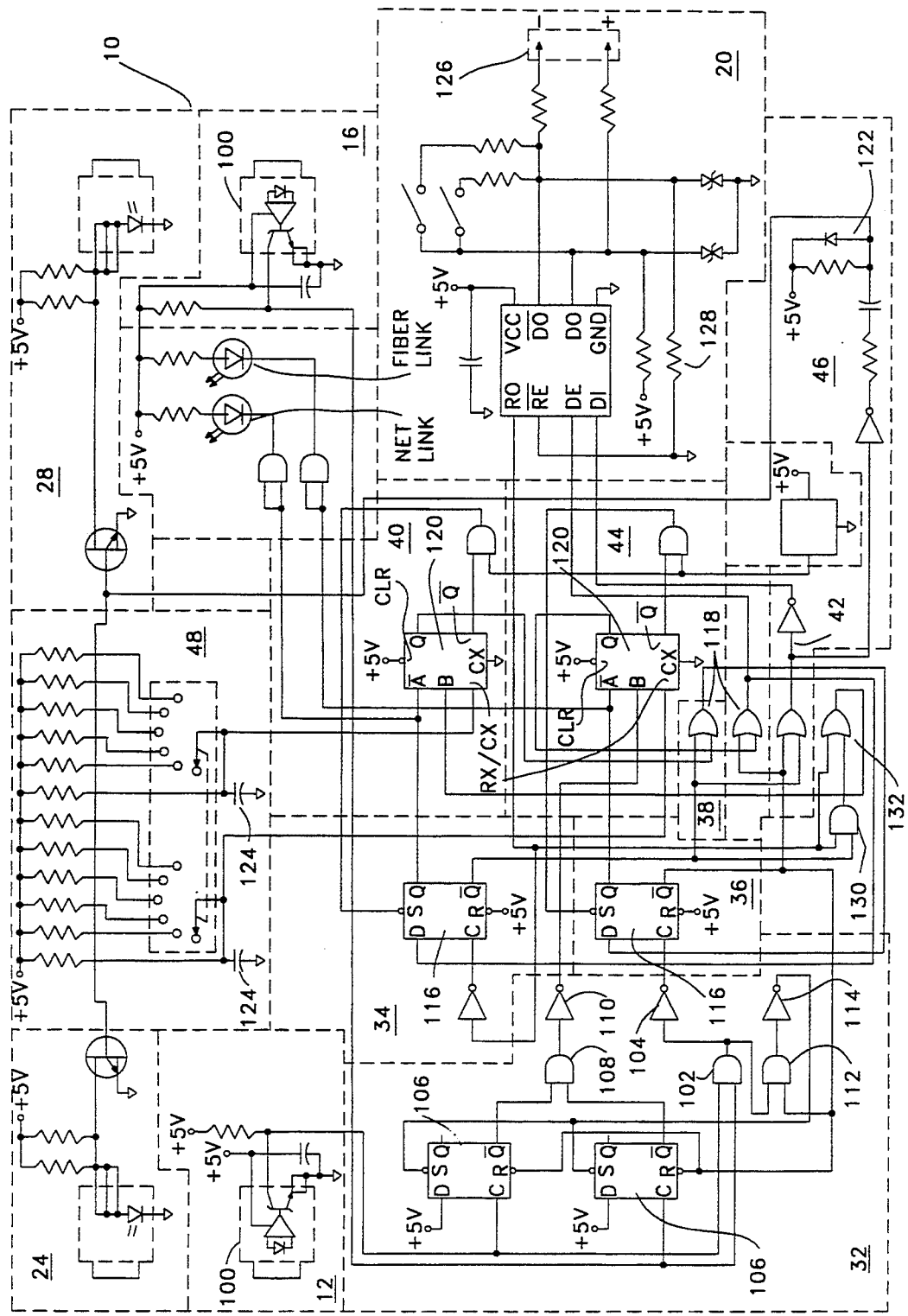
FIG. 3 is a schematic representation of a preferred embodiment of the present invention.

Referring now to FIG. 3, a preferred embodiment is shown as a schematic representation of communications network interface 10, including first optical receiver 12 for receiving incoming optical signals from the first optical fiber and for converting the signals to a digital logic level signal, e.g. such as, in one aspect, a transistor transistor logic (TTL) level electrical signal. This electrical signal also then is fed to receiver data merger 32. Second optical receiver 16 also receives incoming optical signals from the second optical fiber and converts the signals to a TTL level electrical signal. This electrical signal also then is fed to receiver data merger 32. First and second optical receivers 12, and 16, respectively, can be provided by Hewlett Packard HFBR-2402 fiber optic receivers 100. The receiver data merger 32 receives electrical signals from the optical receivers 12, 16 and ANDs them together with AND gate 102. The ANDed result then is inverted by inverter 104 so that any low signal is converted to a high output signal. This output signal then is fed to trigger circuit 36. The data merger 32 also has a component which produces a high output when any input signal to the communications network interface 10 from optical receivers 12 or 16 returns to a high signal. The two RS flip-flops 106 of the type LS74 are held in the reset condition until the trigger circuit 36 has been clocked by a low signal entering the receiver data merger 32. The outputs/Q of the flip-flops 106 are ANDed by AND gate 108 and then inverted by inverter 110. The inverted signal is fed to the second bit timer 44 high trigger. The AND gate 112 plus inverter 114, as well as AND gate 130 plus OR gate 132, act as mechanisms which sends a trigger to the bit timers 40, or 44 in the event that the corresponding trigger output circuit is in a false condition.

Each trigger circuit 34, 36 is an RS flip-flop 116 of the type LS74 which is ready to be clocked to deliver a low output signal on its output Q provided its input D signal is low (an unlock signal) and the input S is high (a reset signal). If these conditions are met, an incoming signal from either the receiver data merger 32, or the interface 20, causes the corresponding trigger circuit 34 or 36 to send a low signal to the bit timer 40 or 44, and a high signal to the trigger interlock 38 or 42. The low signal from the output/Q of each flip-flop 116 also is fed to the transmit interface 46.

Each trigger interlock 38 or 42, which is essentially an OR gate 118, passes a signal from the respective trigger circuit 34, 36 onto the respective bit timer 40, 44 to enable it to react to a highgoing trigger which will come from the receiver data merger 32, or the interface 20, depending on where the previous low signal had originated. Each trigger interlock 38 or 42 also sends a high output signal (lock) to the input of the flip-flop 116 of the first trigger circuit 34 or the second trigger circuit 36. Trigger interlock 42 also presents this high signal (lock) to a driver enable input DE of the RS-485 interface 20, thereby turning on the RS-485 interface only when a signal has originated from one of the optical receivers 12 or 16.

Each bit timer 40 or 44 is a one shot multivibrator 120 of the type LS123 which is triggered by a high signal coming from the receiver data merger 32, or the interface 20. Each bit timer must be enabled by a low signal from the respective trigger circuit 34, 36. An output signal from the respective bit timer 40, 44 extends the lock signal to the input D of the flip-flop 116 of the respective trigger circuit 34, 36. The duration of the extension of this lock signal is determined by baud rate selector 48. This extension time period corresponds to a time period greater than zero but less than the time period equal to one data bit at a given baud rate. A signal from bit timer 40 or 44 also is input to the corresponding trigger circuit 34, 36 which returns the flip-flop immediately to the set condition, causing it then to send out a high signal to the transmit interface 46. After the duration of the lock signal, the trigger circuit 34, or 36 is ready to repeat its function.

The transmit interface 46 accepts signals from either trigger circuit 34 or 36 and drives both the first optical transmitter 24 and the second optical transmitter 28. Transmit interface 46 also drives the transmitter in the RS-485 interface 20. A system fault time constant circuit 122 is provided to prevent continuous deadlock on the system by placing a limit for the time the optical transmitters can be on. The fault time constant circuit is set for a time period of approximately one second. One second is sufficient time for normal communication at any baud rate.

Baud rate selector 48 includes RC circuits 124 and a switch having outputs to control the time period of the one-shot multivibrators 120 in the bit timers 40, 44.

The RS-485 interface 20 has transceiver port 126 with bias resistors 128 which connect to an RS-485 network 22. Low signals entering from the transmit interface 46 propagate to the RS-485 network 22 when the input DE is high. The input DE is turned off after the bit timer 44 is timed out by the lock signal. The driver input signal comes from the output of the transmit interface 46. Since the DE signal may be turned off even though further transmit high levels are desired to be output, the bias resistors 128 take over so that the transmission will appear to be continued as intended. The driver can be provided by a transceiver of the type 3695.

When communications network interface 10 is in the quiescent state, an incoming signal to the RS-485 interface 20 will activate its associated circuits such as the trigger circuit, trigger interlock, and bit timer. The flow of data will be from the RS-485 interface 20 to the first optical transmitter 24 and the second optical transmitter 28. Alternately, a signal which enters from the first or second optical receivers 12 or 16, will activate its associated circuits. The flow of data will then be from the optical receivers to the interface 20 and the optical transmitters 24 and 28.

The first and second optical transmitters 24, 28 convert outgoing electrical signals to optical signals and are fed by the transmit interface 46. The first and second optical receivers 12, 16 convert incoming optical signals to electrical signals.

A reset circuit provides correct power-on states of the flip-flops in the trigger circuits.

Figure 4:
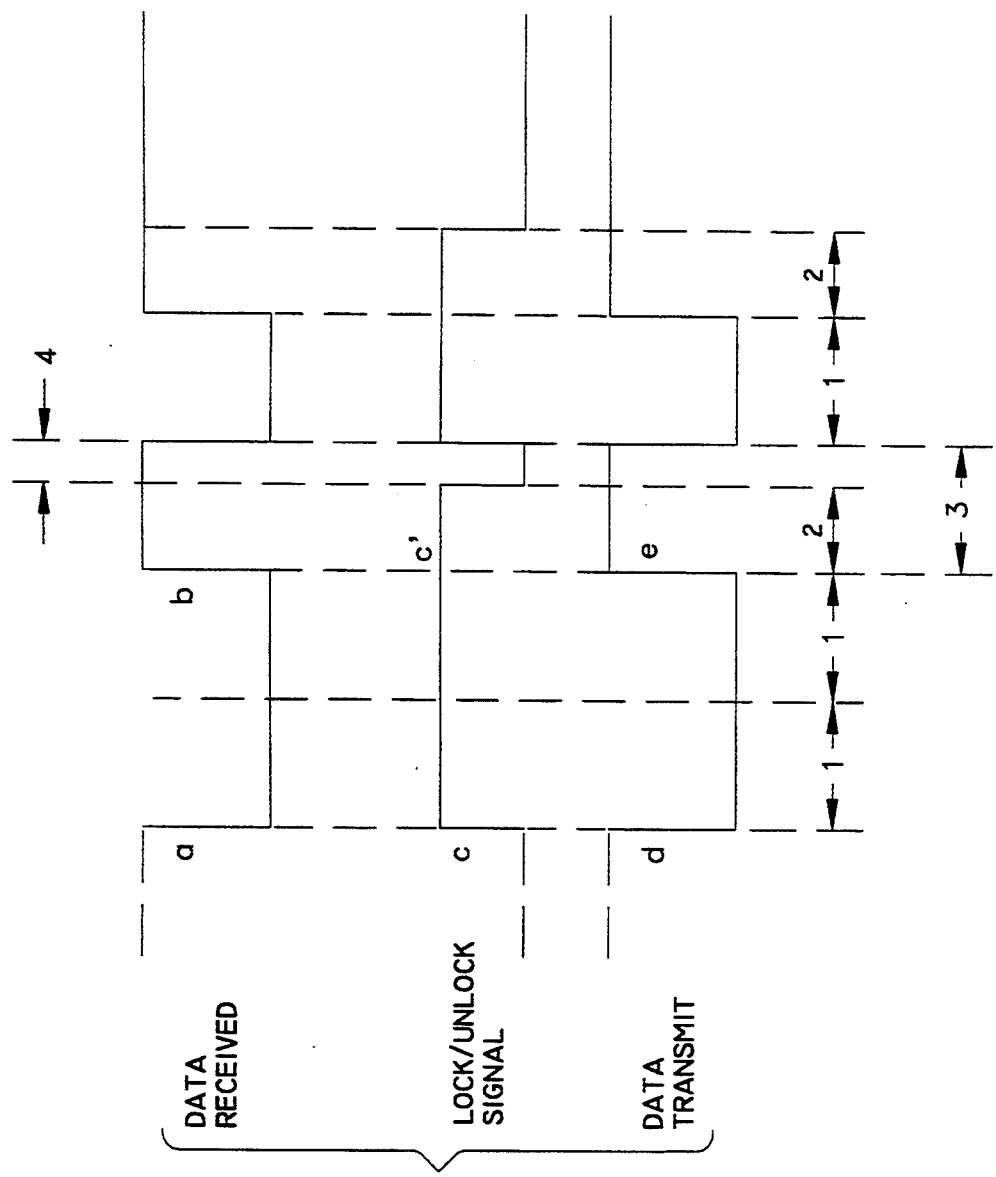
FIG. 4 is a representation of data received signals which translate to trigger signals and data transmitted signals.

FIG. 4 shows the lock/unlock signal timing with respect to data-transmitted signals and data-received signals. For the lock/unlock signal, a high signal equates to a lock signal and a low signal to an unlock signal. FIG. 4 identifies a "1" to represent low signal bit times. FIG. 4 identifies a "2" to represent additional lock time after a high bit transition. A "3" represents high signal bit times, and a "4" represents an unlocked time period for the first and second trigger circuits, 34 and 36 respectively.

At the onset "a" (as shown in FIG. 4) of a low signal, a lock signal "c" is triggered, and a low signal "d" is transmitted. At the onset "b" of a high signal, a lock extend signal "c'" is triggered, and a high signal "e" is transmitted. The lock signal "c" locks out the other trigger circuit from the first output state. The lock extend signal "c'" locks out the other trigger circuit further and resets the corresponding trigger circuit.

Figure 5:
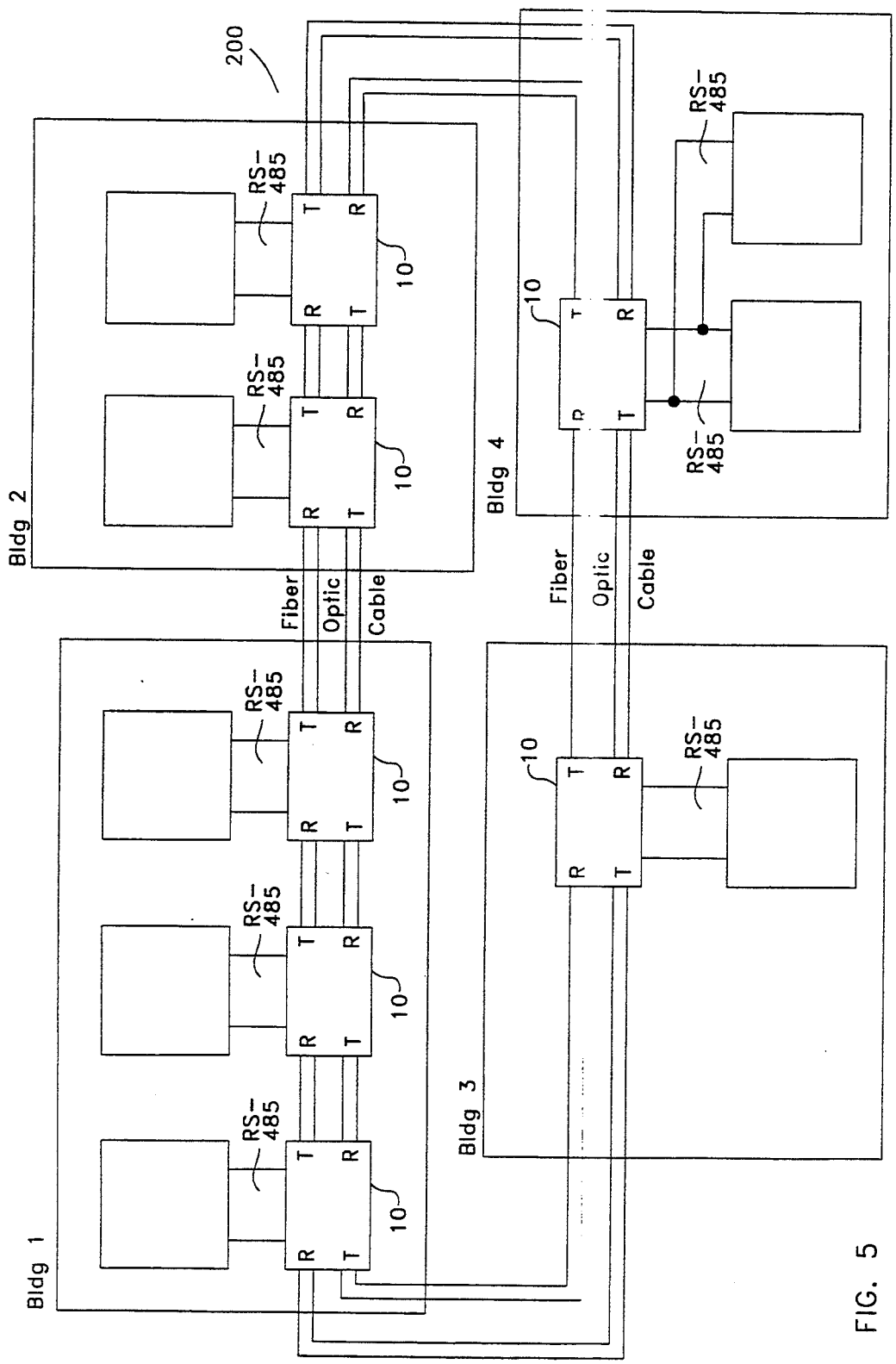
FIG. 5 is a diagram which represents a network formed with the present invention.

FIG. 5 is a diagram representing a network 200 formed between four buildings using communications network interface 10. Each building has at least one typical computer device or network linked into network 200. A "T" represents an optical transmitter connection. An "R" represents an optical receiver connection.

A dual ring of fiber optic cable is connected as shown in the diagram of FIG. 5 so that all optical transmitters and receivers are connected. Such a dual ring configuration can suffer the loss of any single (and in some cases a pair) of fiber optic connections, and the present invention can restore system integrity such that the network still will communicate successfully. The present invention thereby provides a "self redirecting ring."

The present invention provides a system for establishing communication using only a single ring of fiber optic cable, transmitters to receivers, or by connecting two optical fibers between each communications network interface 10 of the present invention, transmitters to receivers, without closing the rings with optical fibers.

Although the invention has been described in detail in the foregoing embodiments for the purpose of illustration, it is to be understood that such detail is solely for that purpose, and that variations can be made therein by those skilled in the art without departing from the spirit and scope of the invention as it may be described by the following claims.

What is claimed is:

1. An apparatus comprising:
    a first optical receiver for receiving optical digital signals from a first optical fiber;
    a second optical receiver for receiving optical digital signals from a second optical fiber;
    a half-duplex interface which communicates with the first and second optical receivers and to a half-duplex line, for receiving electrical digital signals from the half-duplex line, and sending electrical digital signals thereto corresponding to optical digital signals received from either the first or second optical receivers;
    a first optical transmitter means for providing optical digital signals to a third optical fiber corresponding to digital signals received by the first or second optical receivers or the interface;
    a second optical transmitter means for providing optical digital signals to a fourth optical fiber corresponding to signals received by the first or second optical receivers or the interface;
    a receiver data merger connected to the first and second optical receivers for merging the signals therefrom and producing a corresponding signal;
    a first trigger circuit in communication with the interface and the first and second optical transmitters for passing signals from the interface to the transmitters when the first trigger circuit is in a first state;
    a second trigger circuit in communication with the receiver data merger and the interface, and the first and second optical transmitters, for passing signals from the receiver data merger to the interface and to the first and second optical transmitters when the second trigger circuit is in a first state; and
    means for controlling when the first and second trigger circuits are in the first state, said controlling means connected to the first and second trigger circuit, and preventing the first and second trigger circuit from being in the first state at the same time, and for preventing one of the trigger circuits from being in the first state for at least a predetermined period of time corresponding to a time period greater than zero but less than or equal to one bit after the other trigger circuit is in the second state.

2. An apparatus as described in claim 1 wherein the controlling means includes a first trigger interlock connected to the first and second trigger circuits for locking out the second trigger circuit from the first state while the first trigger circuit is in a first state and for the predetermined period of time after the first trigger circuit is in the second state;
    a first bit timer connected to the first trigger interlock for providing a signal to the first trigger interlock causing the first trigger interlock to unlock the second trigger circuit when the predetermined period of time has passed;
    a second trigger interlock connected to the first and second trigger circuits for locking out the first trigger circuit from the first state while the second trigger circuit is in a first state and for the predetermined period of time after the second trigger circuit is in the second state; and
    a second bit timer connected to the second trigger interlock for providing a signal to the second trigger interlock causing the second trigger interlock to unlock the first trigger circuit when the predetermined period of time has passed.

3. An apparatus as described in claim 2 further comprising a dual ring of fiber optic cable to form a self-redirecting ring.

4. Communications network interface comprising:
    a first transceiver for transmitting, and receiving signals over a first signal transmission line;
    a second transceiver for transmitting, and receiving signals over a second signal transmission line;
    a first trigger circuit connected to the first transceiver for passing signals to the second transceiver when the first trigger circuit is in a first output state;
    a second trigger circuit connected to the second transceiver, for passing signals to the first transceiver when the second trigger circuit is in a first output state; and
    means for controlling when the first and second trigger circuits are in the first output state, said controlling means connected to the first and second trigger circuit, and preventing the first and second trigger circuit from being in the first output state at the same time, and for preventing one of the trigger circuits from being in the first output state for at least a predetermined time period greater than zero but less than, or equal to, one bit after the other trigger circuit is in the second output state.

5. A communications network interface as set forth in claim 4 wherein the controlling means includes a first trigger interlock connected to the first and second trigger circuits for locking out the second trigger circuit from the first output state while the first trigger circuit is in a first output state and for the predetermined time period after the first trigger circuit is in the second output state;
- a first bit timer connected to the first trigger interlock for providing a signal to the first trigger interlock causing the first trigger interlock to unlock the second trigger circuit when the predetermined time period has passed;
- a second trigger interlock connected to the first and second trigger circuits for locking out the first trigger circuit from the first output state while the second trigger circuit is in a first output state and for the predetermined time period after the second trigger circuit is in the second output state; and
- a second bit timer connected to the second trigger interlock for providing a signal to the second trigger interlock causing the second trigger interlock to unlock the first trigger circuit when the predetermined time period has passed.

6. A communications network interface as set forth in claim 4 wherein said signals comprise digital signals.

7. A communications network interface as set forth in claim 6 wherein said digital signals comprise electrical signals sent to or from said first transceiver.

8. A communications network interface as set forth in claim 7 wherein said electrical signals are transmitted and received over a first transmission line comprising metallic wire.

9. A communications network interface as set forth in claim 8 wherein said digital signals comprise optical signals sent to or from said second transceiver over an optical transmission line pair.

10. A communications network interface as set forth in claim 9 wherein the predetermined time period corresponds to greater than the loop delay in the network but less than or equal to one data bit at the operating baud rate.

11. A method for controlling signal communications through a data link interface, comprising:
(a) providing interface means for converting or extending signal communications media in a half-duplex data link between at least two devices or networks,
(b) arbitrating the direction of data flow through said interface means without regard to number of start bits, data bits or stop bits or to the type of protocol of the devices on the network, and
(c) converting said signal communications media from electrical to optical or vice versa.

12. A method for controlling signal communications as set forth in claim 11, comprising extending said signal communications media as a repeater for a RS-485 network and monitoring data logic level.

13. A data link interface, comprising:
(a) interface means for converting or extending signal communications media in a half-duplex data link between at least two devices or networks,
(b) means for arbitrating the direction of data flow through said interface means without regard to number of start bits, data bits, or stop bits, or to the type of protocol of the devices on the network, and
(c) means for converting said signal communications media from electrical to optical or vice versa.

14. A data link interface as set forth in claim 13, comprising means for extending said signal communications media as a repeater for a RS-485 network and further comprising means for monitoring data logic level.

15. A data link interface as set forth in claim 13, said means for arbitrating comprising means for detecting whether data is passing through said interface in a first direction and means for preventing data from passing through said interface in a second, other, or opposite direction while data flows in said first direction.

16. A data link interface as set forth in claim 15, said means for arbitrating further comprising means for detecting data passing through said interface in said second, other, or opposite direction and means for preventing data from passing through said interface in said first direction while data flows in said second, other, or opposite direction.

17. An apparatus comprising:
- an optical receiver for receiving optical digital signals from an optical fiber;
- a half-duplex interface which communicates with the optical receiver and to a half-duplex line, for receiving electrical digital signals from the half-duplex line, and sending electrical digital signals thereto corresponding to optical digital signals received from the optical receiver;
- an optical transmitter means for providing optical digital signals to a second optical fiber corresponding to digital signals received by the optical receiver or the interface;
- a first trigger circuit in communication with the interface and the optical transmitter for passing signals from the interface to the optical transmitter when the first trigger circuit is in a first state;
- a second trigger circuit in communication with the optical receiver and the interface, and the optical transmitter, for passing signals from the optical receiver to the interface and to the optical transmitter when the second trigger circuit is in a first state; and
- means for controlling when the first and second trigger circuits are in the first state, said controlling means connected to the first and second trigger circuit, and preventing the first and second trigger circuit from being in the first state at the same time, and for preventing one of the trigger circuits from being in the first state for at least a predetermined period of time corresponding to a time period greater than zero but less than or equal to one bit after the other trigger circuit is in the second state.

18. An apparatus as described in claim 17 wherein the controlling means includes a first trigger interlock connected to the first and second trigger circuits for locking out the second trigger circuit from the first state while the first trigger circuit is in a first state and for the predetermined period of time after the first trigger circuit is in the second state;
- a first bit timer connected to the first trigger interlock for providing a signal to the first trigger interlock causing the first trigger interlock to unlock the second trigger circuit when the predetermined period of time has passed;
- a second trigger interlock connected to the first and second trigger circuits for locking out the first trigger circuit from the first state while the second trigger circuit is in a first state and for the predetermined period of time after the second trigger circuit is in the second state; and a second bit timer connected to the second trigger interlock for providing a signal to the second trigger interlock causing the second trigger interlock to unlock the first trigger circuit when the predetermined period of time has passed.

* * * * *